United States Patent Office 2,953,535
Patented Sept. 20, 1960

2,953,535
RESIN BINDER COMPOSITIONS

Harold K. Salzberg, Bainbridge, and Clair R. Barber, Oxford, N.Y., assignors to The Borden Company, a corporation of New Jersey
No Drawing. Filed Sept. 11, 1957, Ser. No. 683,207
3 Claims. (Cl. 260—19)

The invention here presented is a new resin composition giving unexpected strength and parting effect to bonded foundry sand.

The application is a continuation-in-part of our application, now abandoned, Serial No. 485,305 filed January 31, 1955 for Phenolic Resin Compositions.

Metal castings are quite commonly made in sand molds using cores corresponding in design to the internal contour of the casting. These cores are customarily formed of sand held together in the desired shape by a synthetic resin adhesive. They are not fully satisfactory since they do not have as good strength against handling as is desirable and do not always release cleanly from the core box or pattern.

The present invention comprises the addition to the sand of a resinous formaldehyde condensation product, a tertiary amine having at least 8 carbon atoms to the molecule, and a $C_9$-$C_{18}$ aliphatic carboxylic acid, the amine and the said acid being reacted to give a tertiary amine soap.

Using a phenolic resin and sand or aminoplast mix of the kind conventional in making cores and admixing a tertiary amine, we obtain baked strength up to about 50% higher than without the amine addition. We obtain also good parting when the tertiary amine is used in the form of a salt of stearic or other water insoluble $C_9$-$C_{18}$ aliphatic carboxylic acid, the amine overcoming the weakening effect on the baked cores caused by the acid when introduced into the resin binder without the amine.

The amine and aliphatic acid react with each other, as shown first by the evolution of heat on mixing them. The result is an amine soap, the amine content of which is cationic. The stearic acid as used ordinarily and without the amine is anionic, especially after combining, as it does, with the alkalinity that still remains in the alkali catalyzed condensation product constituting the resin binder.

The sand used is any grade commonly employed in foundry practice in the making of resin bonded cores for receiving cast metal.

The resin used is an alkali-catalyzed, water-soluble (dispersible) condensation product of formaldehyde with a mononuclear phenol (a resole) or with urea, melamine, aniline or the like (an aminoplast). There is no overall advantage in the use of cresol, resorcinol, or xylenol over phenol itself, $C_6H_5OH$. In making the aminoplasts, urea is the formaldehyde-reactive material ordinarily selected.

The phenoplast or resole is made suitably by mixing 1 mol of phenol and 1-3 mols of formaldehyde, the formaldehyde being supplied suitably as a solution of formaldehyde in water. This mixture is alkalized as to pH in the range of 7.5 to 10 by the addition of 0.5 to 4 parts by weight of caustic soda or other alkali to 100 parts dry weight of the mixture of phenol and formaldehyde. The reaction is conducted to advantage at temperatures in the range 70°–100° C. to the "A" stage (resole) which remains dispersed in the water. The water dispersion is then preferably concentrated until it assumes the form of a thick syrup usually containing from 60% to 70% of non-aqueous material.

The aminoplast is made by heating 1 mol of urea, 0.5 of melamine, or 1 of aniline with about 1–2.5 mols, for example, of formaldehyde, as in 37% solution, until a water soluble condensation product is formed.

The tertiary amine used is one that is a cationic surface active agent. It is ordinarily added to the resin after discharge of the condensation product from the kettle and cooled to room temperature. It is thoroughly stirred in and admixed with the resin dispersion so as to obtain a thoroughly homogeneous mixture. The amine may, however, be mixed separately into the sand.

Examples of the surface active, adhesion increasing agents that illustrate the class to be used are R,R'-imidazoline (example: N-ethanol heptadecenyl imidazoline, Amine O or 220), dimethylaminophenol, lauryl dimethylamine, and coconut oil fatty acids dimethylamine (Ethomeen).

All of these cationic strengthening agents contain at least 8 carbon atoms to the molecule. All are tertiary amines.

Such agents as used in our composition yield an increased adhesiveness on the part of the resin and a superior release of the sand from the core box or other material during the molding procedure. In addition, cores or molds prepared from this material show an excellent strength, a superior baked strength, and better collapse by cooling metal after pouring, the combination of the three properties resulting in improved castings at a considerable saving in cost.

Since some of the amines disclosed herein are toxic to certain individuals, they should not be used without following the precautions prescribed by the manufacturers of those amines or by others who can speak with authority as to the hazards and conditions of proper use of the amine.

The carboxylic acids disclosed later herein for use in making the salts with the tertiary amines include such soap forming carboxylic acids as stearic, oleic, pelargonic, and azelaic.

Proportions to be used in the binder composition for best (commercial) results and those permissible for some purposes are shown in the following table.

| Component of Resin Binder | Parts by Weight | |
|---|---|---|
| | Commercial | Permissible |
| Resin (condensation product) | 100 | 100 |
| Amine [1] | 1–5 | 1–15 |
| Aliphatic acid [1] | 1–5 | 1–15 |

[1] For the amine and acid together, commercial proportions are about 2–5 parts, total, with the acid best in excess of that stoichiometrically equivalent to the amine.

The proportion of the resin binder composition to the sand is about 1–10 parts and usually 1–5 for 100 of the sand. Cereal binder, such as gelatinized corn or wheat flour or gelatinized starch may be used in the proportion of about half the resin binder.

In the examples that follow and elsewhere herein proportions are expressed as parts by weight unless specifically stated to the contrary.

Example 1

This example compares the cationics with anionics, the anionics being no part of the invention.

The core mix is conventional, comprising a core sand, cereal binder (gelatinized corn flour, to provide green strength), water (to make the sand moldable), a commercial water soluble phenolic resin (resole) binder (for dry strength) made as described above and a kerosene dispersion (for proper distribution) of an additive either of the class of cationic surface active amines or an anionic agent, as follows:

| Component: | Parts by weight |
|---|---|
| Core sand | 100 |
| Cereal binder | 1 |
| Liquid phenolic resin (resole) | 1 |
| Water | 4 |
| Surface active agent | 0.09, 0.18, and 0.27 |

The sand mix was prepared by mulling all ingredients together and the test cores were formed, baked at 400° F., the water and kerosene being evaporated and the resin advanced by the baking, cooled and tested for strength in a standard tensile machine. Observation was made as to the ease of removal of the core from the core box, i.e. its stickiness or lack of stickiness. A non-sticky sand mix is said to have good "release" properties.

The specific additives, their classes, and the results of their use in the composition tabulated above follow. The tensile strengths are those of the cores baked at 400° F. for 30 minutes and also for 60 minutes.

| Kind of Additive C=Cationic A=Anionic | Property Observed | Additive used, percent of sand | | | |
|---|---|---|---|---|---|
| | | 0 | 0.09 | 0.18 | 0.27 |
| Amine 220 (C) | Sand release | Poor | Poor | Fair | Fair. |
| | Tensile strength, p.s.i.: | | | | |
| | 30 min | 316 | 362 | 360 | 295. |
| | 60 min | 265 | 315 | 315 | 295. |
| Amine 220+Stearic Acid (whole=C) | Sand release | | Excellent | Excell | Excell. |
| | Tensile strength, p.s.i.: | | | | |
| | 30 min | | 298 | 310 | 305. |
| | 60 min | | 324 | 335 | 286. |
| Stearic Acid (A) | Sand release | | Excellent | Excell | Excell. |
| | Tensile strength: | | | | |
| | 30 min | | 165 | 220 | 225. |
| | 60 min | | 190 | 220 | 190. |
| Sodium Oil-sulfonate (A) | Sand release | | Poor | Poor | Poor. |
| | Tensile strength: | | | | |
| | 30 min | | 215 | 215 | 220. |
| | 60 min | | 190 | 195 | 180. |
| Sodium Octyl Sulfonate (A)[1] | Sand release | | Poor | Poor | Poor. |
| | Tensile strength: | | | | |
| | 30 min | | 325 | 315 | 320. |
| | 60 min | | 295 | 300 | 300. |

[1] Duponol 80.

The sand mix containing no additive is not usable because of its stickiness and consequent poor release properties. The sand mix made with stearic acid as additive (which goes to an anionic soap, by reaction with the alkali present in this type of resin) represents a conventional core and sand mix having excellent release properties, but at a large sacrifice in core strength. As shown, both good release and high strength are attained by replacement of the stearic acid with Amine 220 or somewhat better yet by adding both the amine and stearic acid or the amine with another $C_9$–$C_{18}$ aliphatic acid such as pelargonic, azelaic, or oleic.

Example 2

A sand release agent consisting of a cationic active agent (Amine 220) and a higher fatty acid (stearic), reacted in equal parts by weight with the accompaniment of evolution of heat, was used in the following foundry sand mix:

| Component: | Parts by weight |
|---|---|
| Core sand | 2000 |
| Cereal binder | 27.5 |
| Liquid urea formaldehyde resin | 50 |
| Water | 90 |
| Boric acid | 2.2 |
| Iron oxide | 2.2 |
| Kerosene | 7 |
| Release agent | 2 |

The wet sand mixture was mulled to a uniform state and 2 parts of the release agent added. Mixing was continued in order to disperse the agent uniformly in the sand. A second mix was prepared with 2 parts of stearic acid only as release agent. Test cores were formed in accordance with the recommended practice of the American Foundrymens Society. Curing was done in a dielectric oven operating at 4000 v., 8.8 mc., and ¼″ air gap above top of test core, for time intervals of 45 seconds and 1, 2 and 3 minutes.

Tensile strength and hardness values attained by the cores after each period of curing are given for the fatty acid alone and for the reaction product of the acid with the amine. A substantial improvement was obtained with the reaction product over the straight acid in regard to release properties and dry core strength.

| | Fatty Acid (Ordinary Mix) | Fatty Acid Amine Reaction Product |
|---|---|---|
| Curing Period: | | |
| 45 sec | Too weak to test. | Too weak to test. |
| 1 min | do | Do. |
| 2 min | 120 | 205. |
| 3 min | 245 | 275. |
| Core release | Fair | Very good. |

At equal parts by weight of the ingredients, the fatty acid is in excess of that necessary to form the amine soap, leaving unreacted acid in the product, thus providing good core release properties in the sand mix as well as increasing cured core strength.

Example 3

The following core sand mix with the resole resin binder was prepared in duplicate, one batch containing stearic acid and the other a reaction mixture of stearic acid and Amine 220, the acid being in excess of that required chemically to form the amine soap:

| Component: | Parts by weight |
|---|---|
| Core sand | 4000 |
| Cereal binder | 40 |
| Liquid phenolic resin | 40 |
| Water | 160 |
| Kerosene | 20 |
| Release agent (half amine, half st. acid) | 3 |

The control mix was made with 1 gram of stearic acid as release agent. The sand mix was prepared and the cores cured as described in Example 8. The dry core strength values were:

| | Stearic Acid Mix | Stearic Amine Product Mix |
|---|---|---|
| Curing Period: | | |
| 45 sec | 115 p.s.i | 115 p.s.i. |
| 1 min | 130 p.s.i | 120 p.s.i. |
| 2 min | 100 p.s.i | 155 p.s.i. |
| 3 min | 140 p.s.i | 195 p.s.i. |
| Core release | Good | Excellent. |

*Example 4*

The cationic release agent N-ethanol heptadecenyl imidazoline, as a representative tertiary amine having an alkyl group of 16 carbon atoms, was mixed with oleic and in another test with stearic acid in proportions so that the mixture after reaction contained a stoichiometric excess of free fatty acid over the amine. The sand formula was that of a core mix in commercial use for making cast iron pipe, and was the following:

| Component: | Parts by weight |
|---|---|
| Core sand | 4000 |
| Cereal binder | 45 |
| Liquid urea formaldehyde resin | 100 |
| Water | 90 |
| Boric acid | 4.4 |
| Iron oxide | 4.4 |
| Kerosene | 13 |
| Core strengthener and release agent | 3 |

The sand mix was prepared and the cores cured as described in Example 8, but the test was extended to the making and testing of cores from both freshly made sand mixes and sand mixes that had aged for 3 hours. The importance of testing aged sand mix arises from the fact that certain mixtures tend to lose strength upon aging, and the above mix is one of these. Also the testing was extended to include a measurement test as to release properties of the core. This test involves repetitious forming of the core in a single core box and recording the number of cores than can be made before the sand begins to stick to the surface of the core box. The dry strength values in p.s.i. and release ratings for our products with the fatty acid and amine (1.5 parts each) and with the acid but no amine are given below.

| Release Mixture | Stearic Acid +Amine O | Oleic Acid +Amine O | Stearic Acid |
|---|---|---|---|
| Fresh mix: | | | |
| 45 sec. cure | 145 | 150 | 135 |
| 1 min | 190 | 170 | 165 |
| 2 min | 205 | 230 | 175 |
| 3 min | 275 | 280 | 220 |
| Aged mix: | | | |
| 45 sec. cure | 135 | 130 | 115 |
| 1 min | 170 | 135 | 135 |
| 2 min | 190 | 140 | 130 |
| 3 min | 220 | 195 | 140 |
| No. of cores made before sticking occurs | 19 | 4 | 11 |

It will be understood that it is intended to cover all changes and modifications of the examples herein chosen for the purpose of illustration which do not constitute departures from the spirit and scope of the invention.

We claim:

1. A foundry sand composition comprising sand and an admixed binder therefor in the proportion of about 1–10 parts by weight of the binder on the dry basis for 100 of the sand, the binder comprising a mixture of (1) a water dispersible resinous component consisting essentially of a resin selected from the group consisting of mononuclear phenol-formaldehyde resoles and condensation products of formaldehyde with a compound selected from the group consisting of urea and melamine and (2) N-ethanol heptadecenyl imidazoline in the form of a salt thereof with a soap forming carboxylic acid having about 9–18 carbon atoms to the molecule, the proportions being 1–15 parts of the said amine and 1–15 parts of the said acid for 100 parts of the said resinous component.

2. The composition of claim 1, the phenol represented in the resole being $C_6H_5OH$.

3. The composition of claim 2, the proportion of the said acid being in excess of the stoichiometric proportion required to form a salt with the said amine.

References Cited in the file of this patent

UNITED STATES PATENTS

| | | |
|---|---|---|
| 2,267,965 | Wilson | Dec. 30, 1941 |
| 2,268,273 | Wilkes et al. | Dec. 30, 1941 |
| 2,313,672 | Salzberg et al. | Mar. 9, 1943 |
| 2,626,251 | James et al. | Jan. 20, 1953 |
| 2,657,113 | Barlow | Oct. 27, 1953 |
| 2,766,132 | Blair et al. | Oct. 9, 1956 |
| 2,792,404 | Garmaise et al. | May 14, 1957 |
| 2,869,195 | Cooper et al. | Jan. 20, 1959 |

OTHER REFERENCES

Speel: Textile Chemicals and Auxiliaries, pages 334–354, 362–366, Reinhold, New York (1952).